US007703821B2

(12) United States Patent
Swain

(10) Patent No.: US 7,703,821 B2
(45) Date of Patent: Apr. 27, 2010

(54) ERGONOMIC SHROUD FOR MEDICAL GAS CYLINDERS

(75) Inventor: David Swain, Pepper Pike, OH (US)

(73) Assignee: Praxair Technology, Inc., Danbury, CT (US)

(*) Notice: Subject to any disclaimer, the term of this patent is extended or adjusted under 35 U.S.C. 154(b) by 227 days.

(21) Appl. No.: 11/792,219

(22) PCT Filed: Nov. 30, 2005

(86) PCT No.: PCT/US2005/042984

§ 371 (c)(1),
(2), (4) Date: Jun. 1, 2007

(87) PCT Pub. No.: WO2006/060338

PCT Pub. Date: Jun. 8, 2006

(65) Prior Publication Data

US 2007/0257498 A1 Nov. 8, 2007

Related U.S. Application Data

(60) Provisional application No. 60/632,603, filed on Dec. 3, 2004.

(51) Int. Cl.
*B65D 25/22* (2006.01)
*B65G 7/12* (2006.01)

(52) U.S. Cl. ....................... 294/27.1; 294/145; 220/724

(58) Field of Classification Search .................. 294/15, 294/27.1, 31.2, 137, 145; 220/23.91, 318, 220/724, 726, 728
See application file for complete search history.

(56) References Cited

U.S. PATENT DOCUMENTS

| | | | | |
|---|---|---|---|---|
| 1,751,435 | A * | 3/1930 | Zenner | 220/724 |
| 3,006,360 | A * | 10/1961 | Oxenham | 137/382 |
| 3,756,450 | A | 9/1973 | Crose, Jr. | |
| 3,788,511 | A * | 1/1974 | Marsh | 220/23.91 |
| 3,921,872 | A | 11/1975 | Buell, Jr. | |
| 4,236,743 | A | 12/1980 | Fox | |
| 4,310,110 | A | 1/1982 | Dexter | |
| 4,458,933 | A * | 7/1984 | Thomas | 294/31.2 |
| 5,004,117 | A | 4/1991 | Kitsuda | |
| 5,429,152 | A * | 7/1995 | Van Straaten et al. | 137/377 |
| 6,386,384 | B1 | 5/2002 | Chohfi et al. | |
| 6,415,946 | B2 * | 7/2002 | Carlo et al. | 220/724 |
| 7,089,956 | B1 * | 8/2006 | Davidson et al. | 137/382 |

FOREIGN PATENT DOCUMENTS

| | | |
|---|---|---|
| EP | 1 026 438 | 8/2000 |

* cited by examiner

*Primary Examiner*—Dean J Kramer
(74) *Attorney, Agent, or Firm*—Robert J. Hampsch

(57) ABSTRACT

The present invention provides a handle or shroud for carrying or manipulating portable gas cylinders and gas cylinder valves for the administration of medical gases, such as oxygen. The shroud of the present invention provides improved safety and versatility to the handling process of such cylinders and valves. In one embodiment, the handle or shroud allows an individual to lift the cylinder, valve and shroud from about 26" off the ground or floor with the wrist turned up.

5 Claims, 6 Drawing Sheets

ERGONOMIC SHROUD FOR MEDICAL GAS CYLINDERS

This application claims the benefit of U.S. Provisional Application Ser. No. 60/632,603, filed on Dec. 3, 2004, the entire teachings of which are incorporated herein by reference.

TECHNICAL FIELD

The present invention generally relates to handles for use with portable gas cylinders and gas cylinder valves. The present invention more specifically relates to ergonomic shrouds for use with portable gas cylinders and gas cylinder valves.

BACKGROUND OF THE INVENTION

While portable gas cylinders, gas cylinder valves and handles for carrying or manipulating such cylinders and valves for the administration of medical oxygen are known, the handles are often not designed to account for various physical differences among individuals who use such handles. It would therefore be desirable to provide improved ergonomic handles or shrouds for carrying or lifting gas cylinders and gas cylinder valves or regulators (e.g., flow regulators) attached to gas cylinders.

BRIEF SUMMARY OF THE INVENTION

The present invention provides a handle or shroud for carrying or manipulating portable gas cylinders and gas cylinder valves for the administration of medical oxygen or other gases such as heliox. The shroud of the present invention provides improved safety and versatility to the handling process of such cylinders and valves. For example, the handle or shroud allows an individual to lift an E size portable oxygen gas cylinder, valve or regulator and shroud from as low as about 26" off the ground or floor with the wrist turned up when the cylinder is in the vertical position. This is a distance that is significantly less than existing systems using similar cylinders. People of average or less than average height will therefore be better able to lift such devices in an ergonomic manner (e.g., with minimal bending of the individual's arm or without bending the individual's arm beyond the individual's normal range of motion). Lifting of the shroud of the present invention will allow lifting from carts at below shoulder height in many cases.

The shroud of the present invention also protects the fingers of the individual using the shroud by providing unexposed space for the fingers to be inserted within the shroud composite body shell. The shroud further provides additional economy by providing 360 degree access for faster loading and unloading of carts, fill racks, and customer use loading wheel chairs and beds. The shroud of the present invention includes a second handle for safer two hand control by offering greater rotation of the cylinder while placing the shroud, cylinder and cylinder valve in carts, fill racks and hospital and clinical applications. The shroud of the present invention thus provides safer handling capabilities for elderly and physically challenged individuals. Further, the shroud of the present invention helps to reduce the potential for occupational injuries due to improved handling and control.

The handling of the shroud of the present invention does not require the hand to completely close around the shroud handle. Lifting may occur by grabbing the shroud at the lower handle near the bottom of the regulator (valve) underhand. The lifting mechanism may be similar to an underhand scooping action of the cylinder rather than the repetitive motion of closing the fingers around the top handle. Alternatively, one may use the lower handle of the shroud by placing two fingers around each side of the neck of the cylinder valve or regulator.

A protective shroud structure is provided in which the shroud can be connected to a gas valve of a gas cylinder in a manner such that the shroud encloses the gas cylinder valve or regulator/flow regulator. The gas cylinder valve or regulator (e.g., flow regulator) is connected to a gas cylinder. The shroud includes an upper handle and a lower handle configured such that the upper and lower handles are spaced apart from one another to enable the gas cylinder and the gas valve to be manipulated by an individual using the shroud by using the upper handle, the lower handle or both the upper and lower handles.

The lower handle of the shroud is configured such that when the shroud is connected to the gas valve which gas valve is connected to a gas cylinder, the lower handle is positioned proximate to a top portion of the gas cylinder. The lower handle is further positioned such that an individual using the shroud can insert the individual's fingers into the lower handle and manipulate the gas cylinder, the gas valve and the shroud. The lower handle forms a dependent lip on the bottom portion of the shroud. The lip is an annular lip that allows the individual using the shroud to manipulate the gas cylinder, the gas valve and the shroud in any of 360 degrees. The lip can also be outwardly flared.

The foregoing has outlined some of the pertinent features of the present invention. These features should be construed to be illustrative of some of the more prominent features of the invention. Other objects and a fuller understanding of the invention may be had by referring to the following Detailed Description of the invention.

BRIEF DESCRIPTION OF THE DRAWINGS

For a more complete understanding of the present invention and the advantages thereof, reference is made to the following Detailed Description taken in conjunction with the accompanying drawings in which.

DETAILED DESCRIPTION

Figure 1:
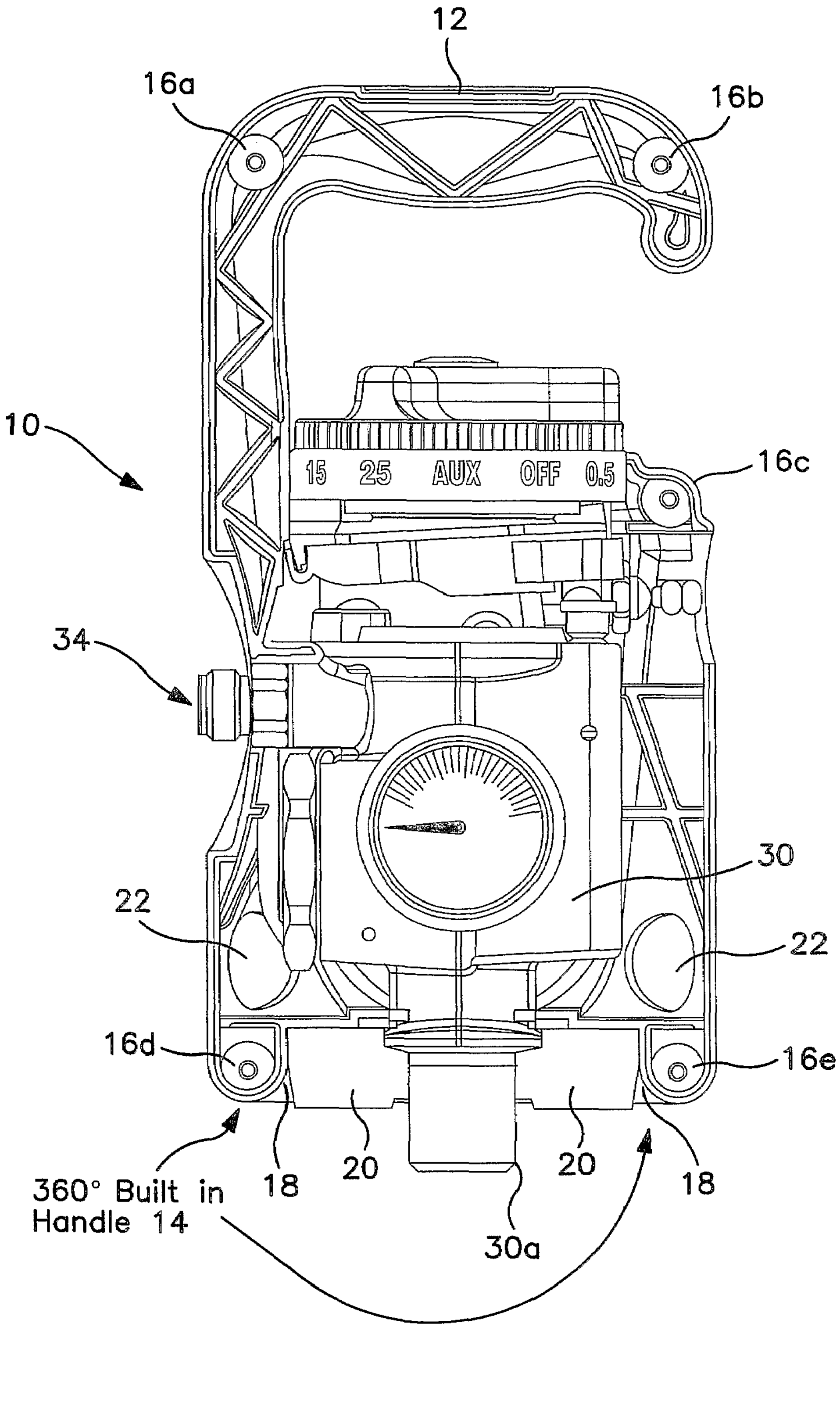
FIGS. 1-9 illustrate various views of the shroud in accordance with the present invention.

The present invention provides a handle or shroud for carrying or manipulating portable gas cylinders and gas cylinder valves for the administration of medical oxygen or other gases such as heliox. The shroud of the present invention provides improved safety and versatility to the handling process of such cylinders and valves. In one embodiment, the handle or shroud allows an individual to lift an E size portable oxygen gas cylinder, valve or regulator and shroud from as low as about 26" off the ground or floor with the wrist turned up when the cylinder is in the vertical position. This is a distance that is significantly less than existing systems. People of average or less than average height will therefore be better able to lift such devices in an ergonomic manner. Lifting of the shroud of the present invention will allow lifting from carts at below shoulder height in many cases.

The lower handle of the ergonomic shroud is formed as an integral part of the composite shell. The handle or shroud may be smooth in form. The shroud of the present invention also protects the fingers of the individual using the shroud by providing unexposed space for the fingers to be inserted within the shroud composite body shell.

The shroud further provides additional economy by having 360 degree access for faster loading and unloading of carts, fill racks, and customer use loading wheel chairs and beds. The shroud of the present invention includes a second handle for safer two hand control by offering greater rotation of the cylinder while placing the shroud, cylinder and cylinder valve in carts, fill racks and hospital and clinical applications. The shroud of the present invention thus provides safer handling capabilities for elderly and physically challenged individuals. Further, the shroud of the present invention helps to reduce the potential for occupational injuries due to improved handling and control. The shroud of the present invention thus allows individuals who handle numerous oxygen cylinders on a daily basis to have much greater flexibility when handling small oxygen cylinders such as the E and D size.

Referring now to the Figures, handle or shroud 10 of the present invention includes upper handle 12 and lower handle 14. Upper handle 12 can be formed in an inverted J-like configuration as shown in the figures and provides a method for lifting the cylinder, valve and shroud. Lower handle 14 is formed within the bottom portion of the composite body of the shroud. As shown in the figures, lower handle 14 includes lip portion 18 to allow the user to manipulate the shroud, valve (or regulator) 30 and gas cylinder (not shown) by grabbing the shroud in an underhand fashion or by placing two fingers around each side of the neck 30*a* of valve or regulator 30. In this manner, the shroud, valve and cylinder can be manipulated by the upper handle 12, the lower handle 14 or both the upper handle 12 and lower handle 14.

Figure 3:
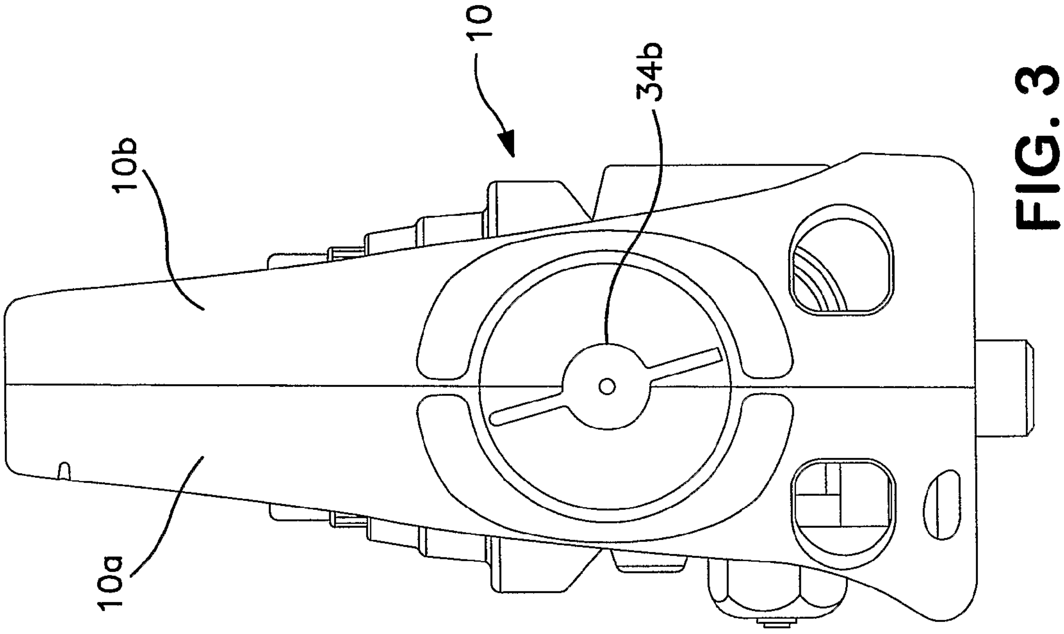
Figure 2:
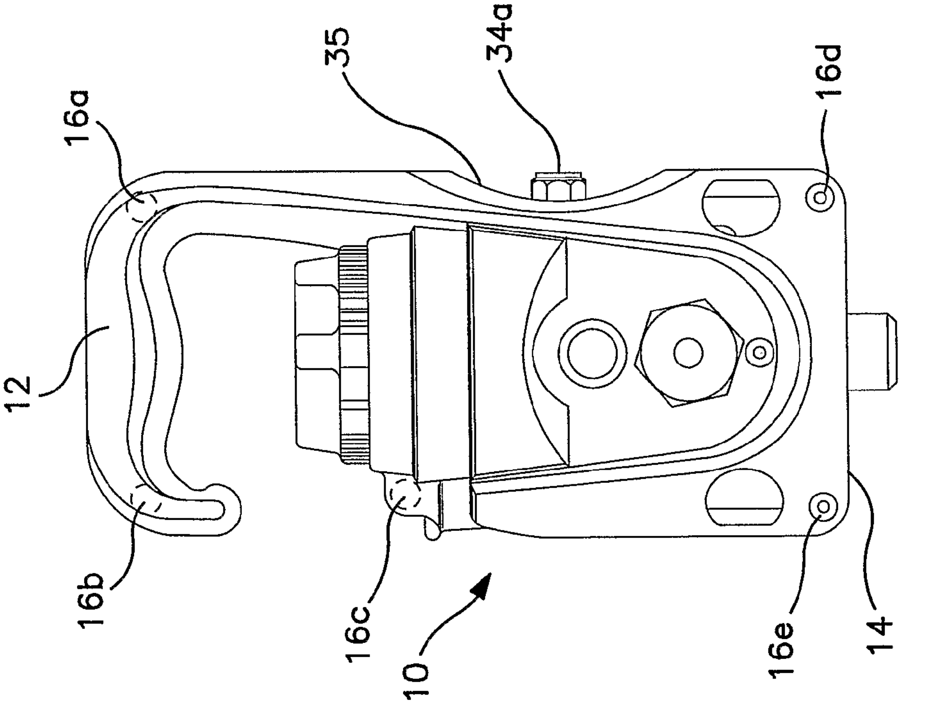
Figure 6:
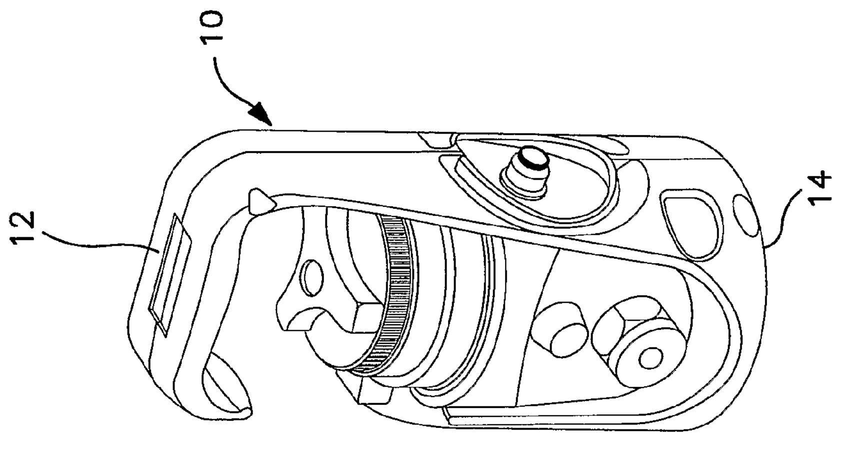
Figure 5:
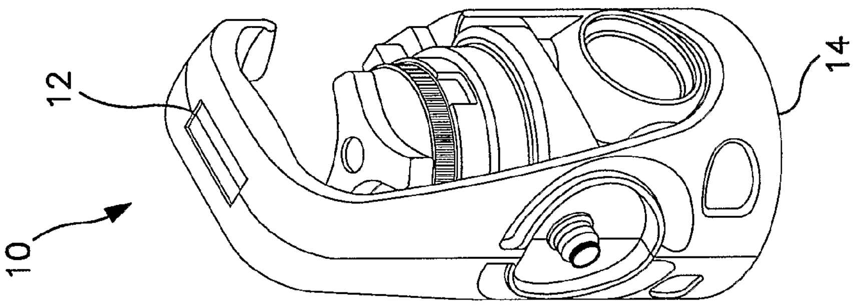
Figure 4:
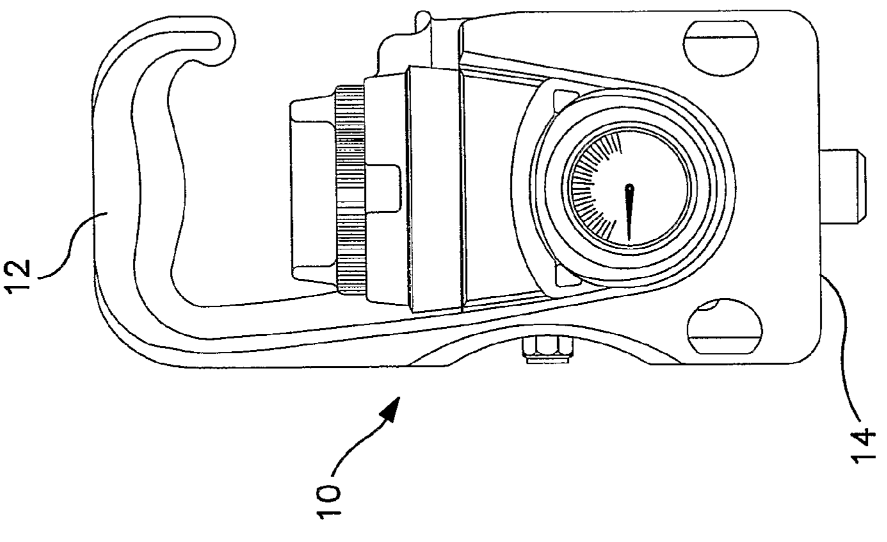
Figure 7:
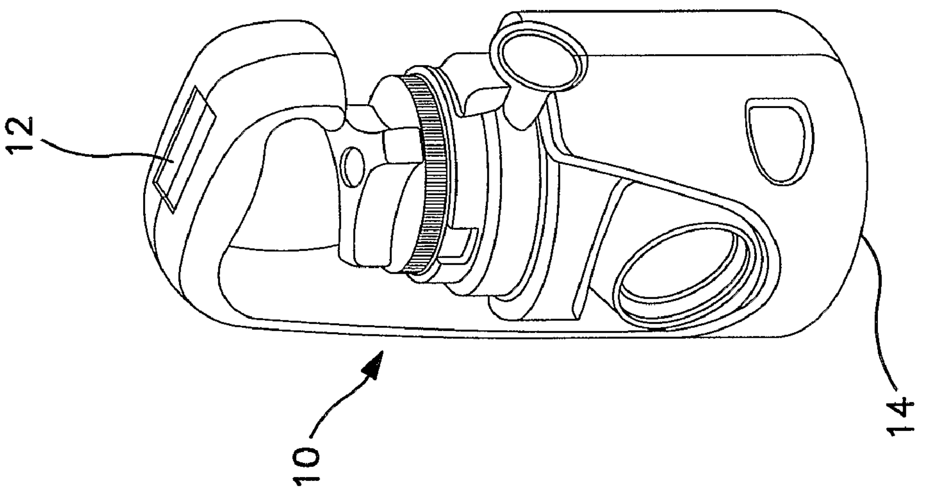
Figure 8:
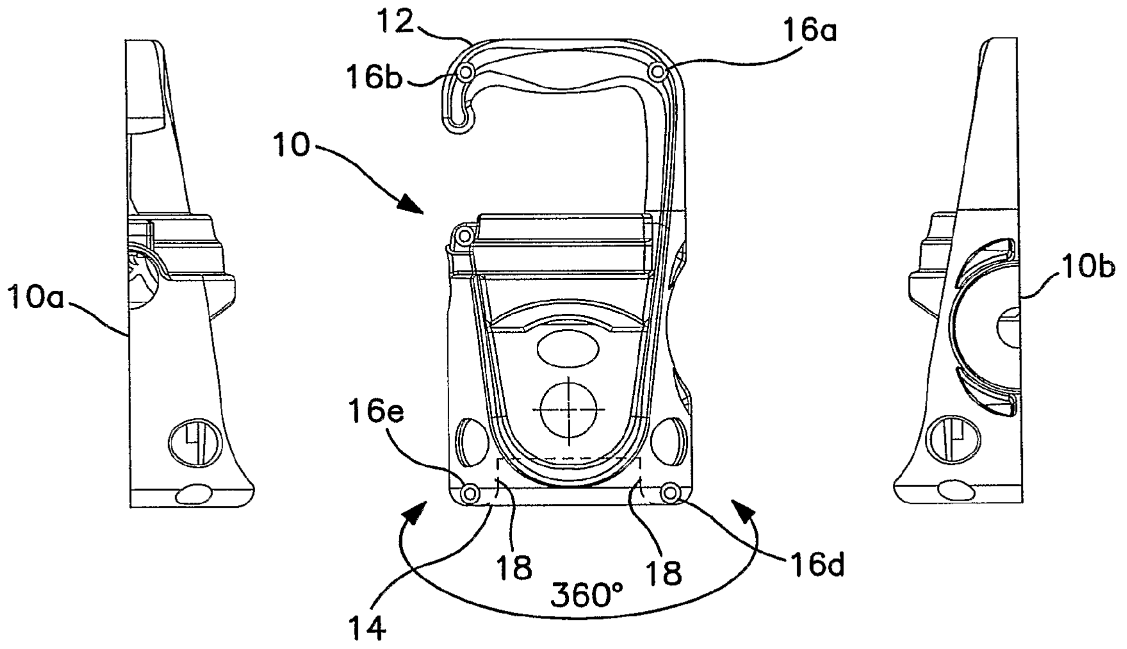
Figure 9:
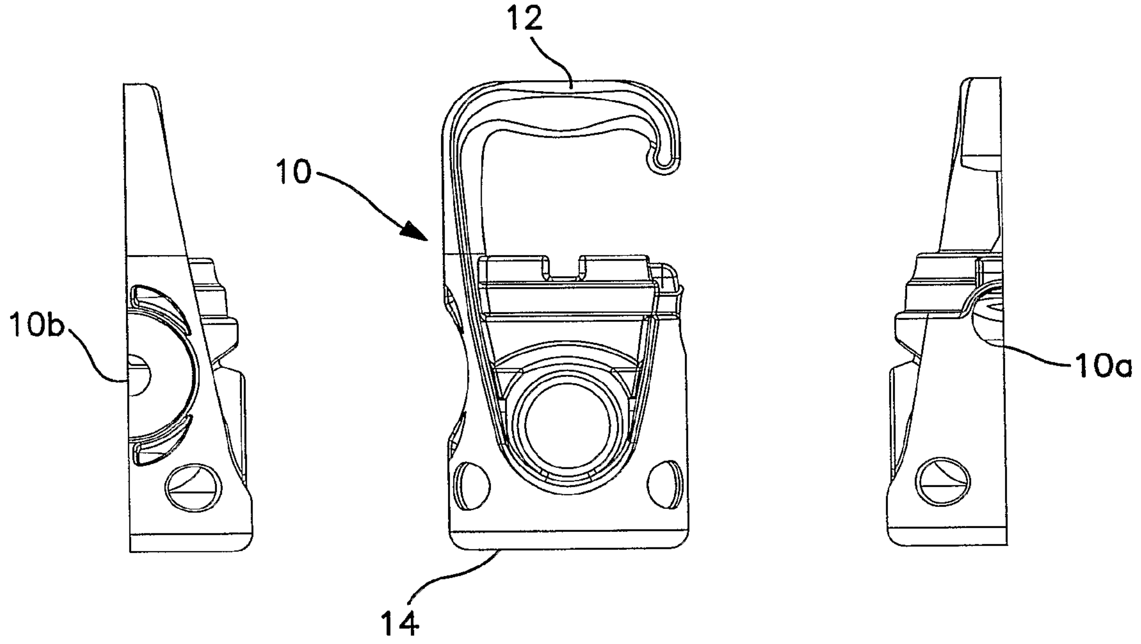

The shroud 10 is also designed to form a concave enclave 35 surrounding an outlet port 34 and providing enough space to install and fit a protecting cap to outlet port 34, which cap is used during transport or when the device is not in use. The protecting cap can be of a hexagonal bolt-type 34*a* (FIGS. 2 and 4) or of a larger propeller-type 34*b* (FIG. 3) for easier installation and removal.

Lip portion 18 of lower handle 14 can be formed in an annular configuration, thereby providing space 20 for fingers to be inserted therein. In this manner, an individual has 360 degree access to lower handle 14 and can therefore grasp lower handle 14 from any direction. This configuration provides additional economy for faster loading and unloading of carts, fill racks, customer use loading wheel chairs and beds and the like.

As discussed above, the shrouds of the present invention are designed to be used with gas cylinders (e.g. oxygen gas cylinders) and gas cylinder valves or flow regulators. The shroud 10 may initially be formed in component plastic parts, for example parts 10*a* and 10*b*. The neck region 30*a* of valve 30 is threaded into a gas cylinder (not shown). The shroud of the present invention is then placed around the valve 30 by joining component parts 10*a* and 10*b* together. Components 10*a* and 10*b* can be held together with a plurality of screws or the like (for example, screws 16*a*-16*e*). Shroud 10 may be formed of plastic, for example a LEXAN® plastic such as EXL1414 plastic commercially available from General Electric. The shroud may also be of a distinctive color(s) to facilitate selection of the correct unit and reduce or eliminate confusion in an emergency. For example, the shroud may be color-coded based on U.S. Food and Drug Administration (FDA) and/or Compressed Gas Association (CGA) guidelines. Composite holes 22 can be included for testing for leaks.

Once the shroud, valve and cylinder are assembled, there is sufficient space remaining for most individuals to insert fingers into space 20. The handling of the shroud of the present invention does not require the hand to completely close around the shroud handle. Lifting may occur by grabbing the shroud at the lower handle near the bottom of the regulator (or valve) underhand. The lifting mechanism may be similar to an underhand scooping action of the cylinder rather than the repetitive motion of closing the fingers around the top handle. Alternatively, one may use the lower handle by placing two fingers around each side of the neck region of the regulator or valve.

It should be appreciated by those skilled in the art that the specific embodiments disclosed above may be readily utilized as a basis for modifying or designing other structures for carrying out the same purposes of the present invention. For example and while not to be construed as limiting, the shroud of the present invention can also include an RFID (i.e. radio frequency identification device) chip or bar code that is invisible to the user (i.e. positioned inside the shroud) such that an the whereabouts of the shroud can be tracked at anytime. It should also be realized by those skilled in the art that such equivalent constructions do not depart from the spirit and scope of the invention.

What is claimed is:

1. A protective shroud for a medical gas cylinder valve, the shroud comprising:

a generally cylindrical body adapted to connect with and enclose a medical gas cylinder valve or regulator on a medical gas cylinder, the body having a distal end and a proximate end;

an upper handle having an inverted J-like configuration with a grasping portion disposed in an orthogonal orientation with respect to an axis of the cylindrical body and an extending portion extending upward from the distal end of the body and defining an opening between the distal end of the body and the grasping portion of the upper handle to allow an individual to grasp the shroud by the upper handle;

a lower handle disposed at the proximal end of the body, the lower handle having an annular lip defining a space adapted to allow an individual to grasp the shroud; and a plurality of recesses or openings to allow access to and operation of the medical gas cylinder valve or regulator, wherein the upper and lower handles are spaced apart from one another to enable the medical gas cylinder and the medical gas cylinder valve or regulator to be manipulated by an individual using the shroud by using the upper handle, the lower handle or both the upper and lower handles.

2. The shroud as described in claim 1, wherein the lower handle is configured such that when the shroud encloses a medical gas cylinder valve or regulator that is connected to the medical gas cylinder, the lower handle is positioned proximate to a top portion of the gas cylinder.

3. The shroud as described in claim 2, wherein the lower handle is further positioned such that an individual can insert the individual's fingers into the lower handle and manipulate the medical gas cylinder, the medical gas cylinder valve or regulator and the shroud.

4. The shroud as described on claim 1 wherein the annular lip is outwardly flared.

5. The shroud of claim 1 wherein the shroud is formed of at least two components.

* * * * *